(12) United States Patent
Ikeda et al.

(10) Patent No.: US 9,956,582 B2
(45) Date of Patent: May 1, 2018

(54) SEALANT APPLYING APPARATUS AND SEALANT APPLYING METHOD

(71) Applicant: MITSUBISHI HEAVY INDUSTRIES, LTD., Tokyo (JP)

(72) Inventors: Yusuke Ikeda, Tokyo (JP); Toshiyuki Funato, Tokyo (JP); Yosuke Ikeda, Tokyo (JP); Akihito Suzuki, Tokyo (JP); Kunihiro Kuroi, Tokyo (JP); Takahiro Inagaki, Tokyo (JP); Yuji Kondo, Tokyo (JP); Tsugumaru Yamashita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 35 days.

(21) Appl. No.: 14/437,414

(22) PCT Filed: Oct. 28, 2013

(86) PCT No.: PCT/JP2013/079101
§ 371 (c)(1),
(2) Date: Apr. 21, 2015

(87) PCT Pub. No.: WO2014/069393
PCT Pub. Date: May 8, 2014

(65) Prior Publication Data
US 2015/0251212 A1    Sep. 10, 2015

(30) Foreign Application Priority Data
Oct. 30, 2012  (JP) .................. 2012-239154

(51) Int. Cl.
| *B05D 1/00* | (2006.01) |
| *B05B 3/02* | (2006.01) |
| *B05C 13/02* | (2006.01) |
| *F16B 33/00* | (2006.01) |
| *B05C 5/02* | (2006.01) |
| *F16B 33/06* | (2006.01) |

(52) U.S. Cl.
CPC ................ *B05D 1/002* (2013.01); *B05B 3/02* (2013.01); *B05C 5/0216* (2013.01); *B05C 13/02* (2013.01); *F16B 33/004* (2013.01); *F16B 33/06* (2013.01)

(58) Field of Classification Search
None
See application file for complete search history.

(56) References Cited

U.S. PATENT DOCUMENTS 4,842,890 A * 6/1989 Sessa .................. B05B 13/0235
411/302
2010/0278608 A1  11/2010 Toosky

FOREIGN PATENT DOCUMENTS

CN    201143486 Y    11/2008
CN    101342521 A    1/2009
(Continued)

OTHER PUBLICATIONS

Canada Patent Office, "Notice of Allowance for Canadian Patent Application No. 2888952," dated Nov. 1, 2016.
PCT/IB/338, "Notification of Transmittal of Translation of the International Preliminary Report on Patentability for International Application No. PCT/JP2013/079101," dated May 14, 2015.
(Continued)

*Primary Examiner* — Jethro M Pence
(74) *Attorney, Agent, or Firm* — Manabu Kanesaka; Benjamin Hauptman; Kenneth Berner

(57) ABSTRACT

A sealant applying apparatus includes a fastener rotating unit which supports a fastener to be rotatable around a central axis, and a sealant discharging unit which applies a sealant to the fastener by discharging the sealant. The fastener rotating unit includes a first holding member and a second holding member which hold the fastener to be rotatable, and a base which supports the first and second holding members. The first holding member is installed to the base to be exchangeable.

8 Claims, 17 Drawing Sheets

(56) References Cited

FOREIGN PATENT DOCUMENTS

| CN | 101757999 | | 6/2010 | |
|----|-----------|---|--------|---|
| CN | 101811110 A | * | 8/2010 | |
| JP | S57-191467 | * | 6/1981 | ........... B05C 5/0216 |
| JP | 1982-128375 U | | 8/1982 | |
| JP | 1982-191467 U | | 12/1982 | |
| JP | S59-115185 | * | 7/1984 | .............. B25J 15/04 |
| JP | S59-115185 A | | 7/1984 | |
| JP | H02-095470 A | | 4/1990 | |
| JP | H03-077670 A | | 4/1991 | |
| JP | H11-70351 A | | 3/1999 | |
| JP | 2001-239203 A | | 9/2001 | |
| JP | 2003-024864 A | | 1/2003 | |
| JP | 2008-302399 A | | 12/2008 | |
| JP | 2012-210564 A | | 11/2012 | |
| JP | 2012-240015 A | | 12/2012 | |
| WO | WO2012/161056 A1 | | 11/2012 | |

OTHER PUBLICATIONS

PCT/IB/373, "International Preliminary Report on Patentability for International Application No. PCT/JP2013/079101," dated May 5, 2015.

PCT/ISA/237, "Written Opinion of the International Searching Authority for International Application No. PCT/JP2013/079101," dated Jan. 28, 2014.

PCT/IB/326, "Notification Concerning Transmittal of International Preliminary Report on Patentability for International Application No. PCT/JP2013/079101," dated May 14, 2015.

China Patent Office, "Office Action for Chinese Patent Application No. 2013800055177.5," dated Jun. 8, 2016.

PCT/ISA/210, "International Search Report for PCT/JP2013/079101", dated Oct. 28, 2013.

Japan Patent Office, "Decision to Grant a Patent for Japanese Patent Application No. 2012-239154," dated Jan. 18, 2017.

* cited by examiner

SEALANT APPLYING APPARATUS AND SEALANT APPLYING METHOD

RELATED APPLICATIONS

The present application is National Phase of International Application No. PCT/JP2013/079101 filed Oct. 28, 2013, and claims priority from Japanese Application No. 2012-239154, filed Oct. 30, 2012, the disclosure of which is hereby incorporated by reference herein in its entirety.

TECHNICAL FIELD

The present invention relates to a sealant applying apparatus and a sealant applying method.

BACKGROUND ART

The technique of fastening a workpiece by using a fastener (a fastening member) such as a bolt and a rivet is used for assembling an aircraft. When a part of the main wing of the aircraft should be fastened by using the fastener, a fastening portion is sealed to prevent fuel leakage.

A method of fastening a workpiece of composite members such as fiber reinforced plastics will be described with reference to FIG. 1 to FIG. 6.

As shown in FIG. 1, a workpiece 3 contains composite members 1 and 2 which are stacked. A hole 4 with a countersink is formed to pass from a surface 5 on one side of the work 3 to a rear surface on the other side. The countersink of the hole 4 is arranged on the side of the surface 5. The workpiece 3 has a countersink wall 7 which surrounds the countersink. After the hole 4 with the countersink is formed, the workpiece 3 is cleaned to remove burr produced in case of forming the the hole 4 with the countersink.

FIG. 2 shows a fastener 8 as a fastening member to fasten the workpiece 3. For example, the fastener 8 is a hack tight fastener. The fastener 8 includes a countersunk bolt 9 and a sleeve 10. The sleeve 10 has a pipe shape and the countersunk bolt 9 is inserted into the sleeve 10. The countersunk bolt 9 includes a countersunk head 11, a circular column section 12, and a screw section 13. The countersunk head 11 has a head surface 14 and a head side surface 18. The head side surface 18 is formed to have a shape of a side surface of a circular truncated cone. The circular column section 12 is arranged between the countersunk head 11 and the screw section 13. A screw is not formed in the circular column section 12. The screw section 13 has an end surface 15. The head surface 14 and the end surface 15 are arranged at both ends of the fastener 8 in the axial direction. The sleeve 10 covers the circular column section 12. A part of the circular column section 12 which is near the countersunk head 11 is exposed from the sleeve 10. The sleeve 10 includes a countersink section 16 disposed on the side of the countersunk head 11 and a circular cylinder section 17 arranged on the side of the screw section 13. The countersink section 16 is conically formed.

As shown in FIG. 3, until the countersink section 16 hits against the countersink wall 7, the fastener 8 is pushed into the hole 4 with the countersink. In a condition that the countersink section 16 contacts the countersink wall 7, the countersink head 11 protrudes from the surface 5 and the screw section 13 protrudes from the surface 6.

As shown in FIG. 4, an impact force is repeatedly applied to the head surface 14 by using an air hammer 19 so that the fastener 8 is hit into the hole 4.

As shown in FIG. 5, the impact force is repeatedly given to the head surface 14 by using the air hammer 19, until the fastener 8 is located in the workpiece 3, that is, until the countersink head 11 hits against the countersink wall 7 through the countersink section 16. Here, an operator determines in sound that the fastener 8 is located and stops the application of the impact force by the air hammer 19.

As shown in FIG. 6, a nut 20 is attached to the screw section 13 to fasten the composite members 1 and 2.

Here, in order to seal the fastening section, a sealant is applied on the countersink section 16, the circular cylinder section 17 and the head side surface 11 with a brush in handwork. It is visually confirmed that the sealant is completely applied. When the sealant is applied in handwork, the work time takes greatly and it is difficult to stabilize the quality.

In relation to the above, Patent Literature 1 discloses a sealant applying apparatus which applies the sealant in a rivet hole.

Also, Patent Literature 2 discloses a riveting machine to combine a plurality of fastened members with a rivet. With reference to FIG. 7, a chuck mechanism of the riveting machine will be described. A rivet inserting unit of the riveting machine includes a piston member 100 disposed to be slidable and a rivet pushing rod 102 attached to the piston member 100. The rivet pushing rod 102 includes an attaching section 103. The piston member 100 includes an attachment hole 101 which has substantially the same shape as the attaching section 102 and engages with the attaching section 103. The chuck mechanism 105 is disposed at tip of the rivet pushing rod 102. The chuck mechanism 105 is made openable and closable by being biased by a coil spring 104, and hold an axis section of the rivet in the closed state.

CITATION LIST

[Patent Literature 1] JP H11-70351A
[Patent Literature 2] JP 2008-302399A

SUMMARY OF THE INVENTION

It could be considered to use a sealant applying apparatus to stably apply the sealant to an axial section of the fastener. The sealant applying apparatus includes a member to support the fastener and a mechanism which applies the sealant to the fastener. By using such an apparatus, the sealant can be applied uniformly, compared with a case where a worker applies the sealant in handwork.

However, when the sealant applying apparatus is used, there is a case that the sealant adheres to the member to support the fastener. As a result, when the sealant is to be applied to the next fastener, the sealant adheres to the next fastener from the member to support the fastener. Thus, there is a possibility that the sealant is adhered to an unnecessary portion of the fastener.

Therefore, an object of the present invention is to provide a sealant applying apparatus and a sealant applying method, in which the sealant can be applied appropriately.

A sealant applying apparatus of the present invention includes: a fastener rotating unit configured to support a fastener to be rotatable around a central axis of the fastener; and a sealant discharging unit configured to discharge a sealant to apply the sealant to the fastener. The fastener rotating unit includes: a first holding member and a second holding member configured to hold the fastener to be rotatable; and a base configured to support the first holding member and the second holding member. The first holding member is installed to the base to be exchangeable.

A sealant applying method of the present invention includes: supporting a fastener by a first holding member and a second holding member which are supported by a base to be rotatable around a central axis; applying a sealant to the fastener by discharging the sealant; and exchanging the first holding member.

According to the present invention, the sealant applying apparatus and the sealant applying method are provided, in which the sealant can be applied appropriately.

DESCRIPTION OF EMBODIMENTS

Hereinafter, the embodiments of the sealant applying apparatus will be described with reference to the attached drawing.

First Embodiment

Figure 1:
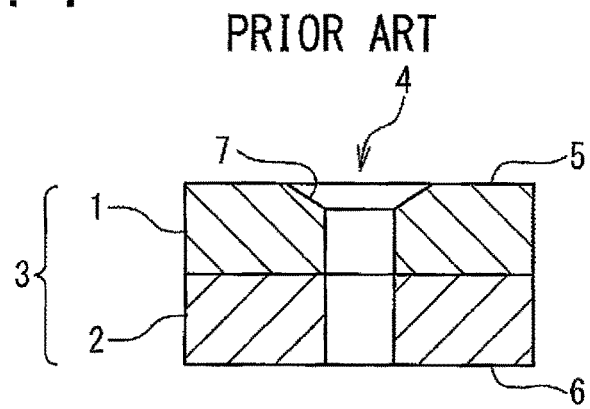
FIG. 1 is a diagram showing a method of fastening a workpiece.
Figure 2:
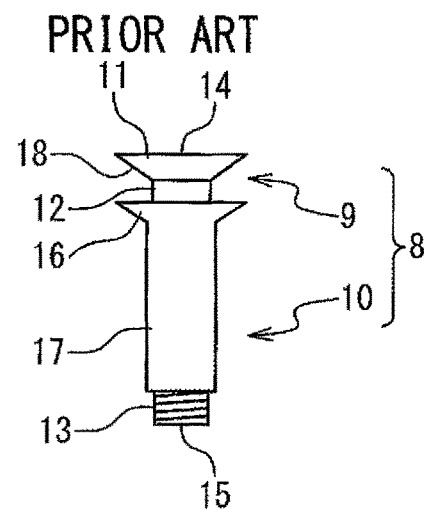
FIG. 2 is a diagram showing the method of fastening the workplace.
Figure 3:
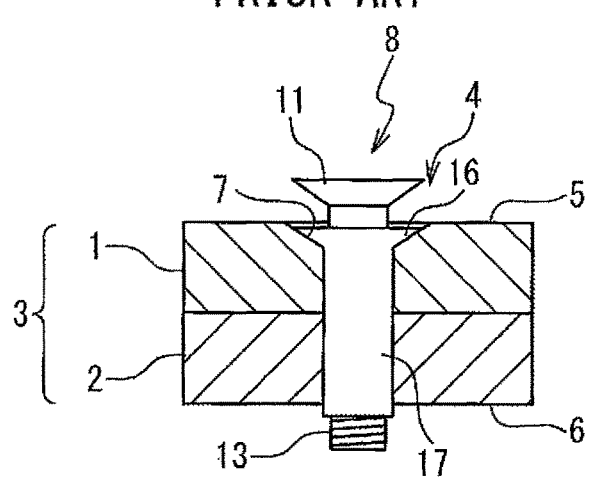
FIG. 3 is a diagram showing the method of fastening the workpiece.
Figure 4:
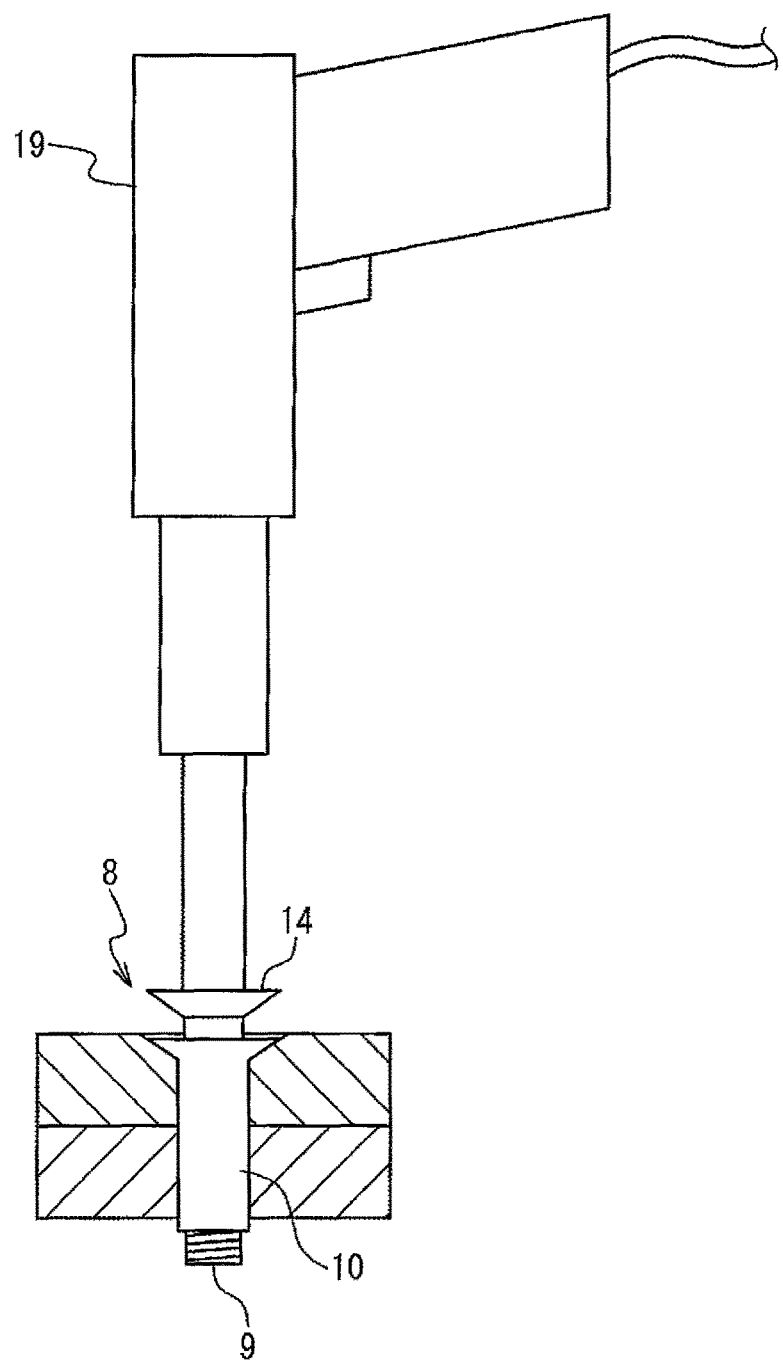
FIG. 4 is a diagram showing the method of fastening the workplace.
Figure 5:
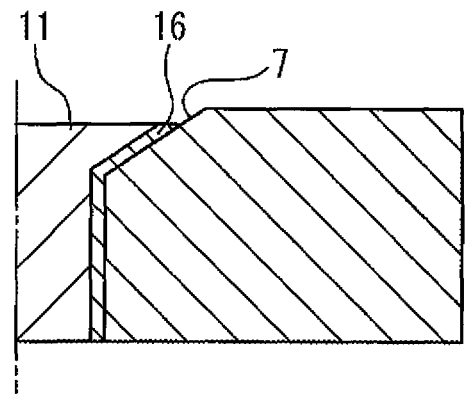
FIG. 5 is a diagram showing the method of fastening the workpiece.
Figure 6:
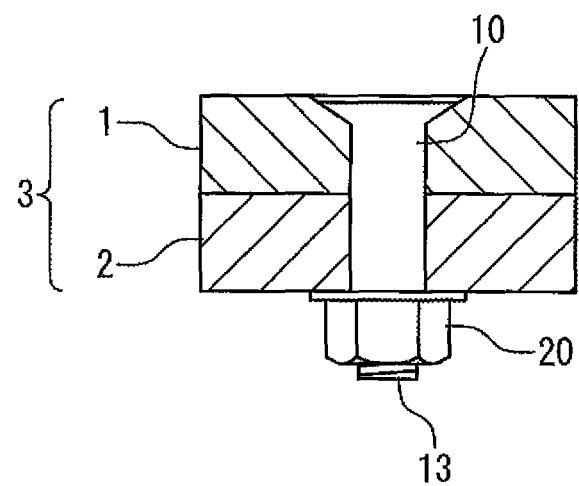
FIG. 6 is a diagram showing the method of fastening the workpiece.
Figure 7:
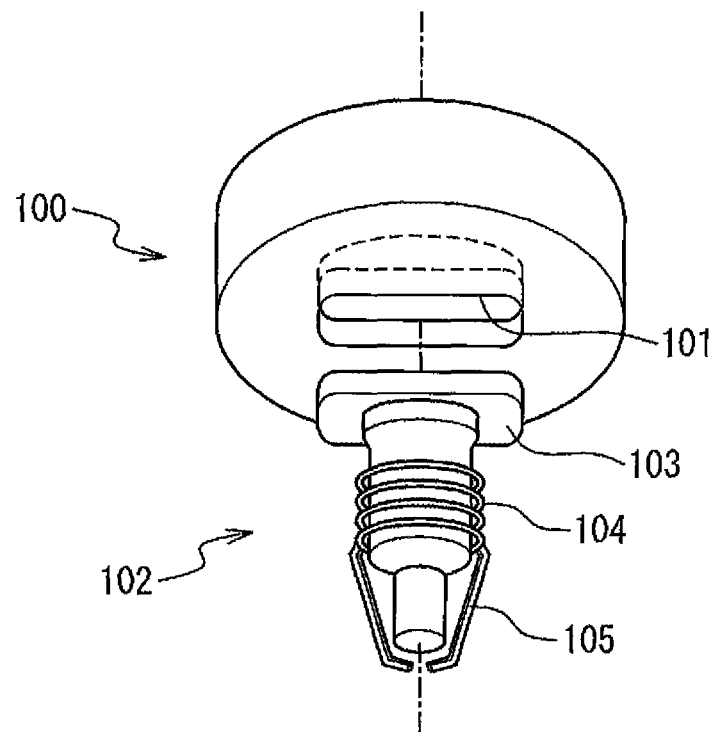
FIG. 7 is a diagram showing a chuck mechanism of a riveting machine described in Patent Literature 2.
Figure 8:
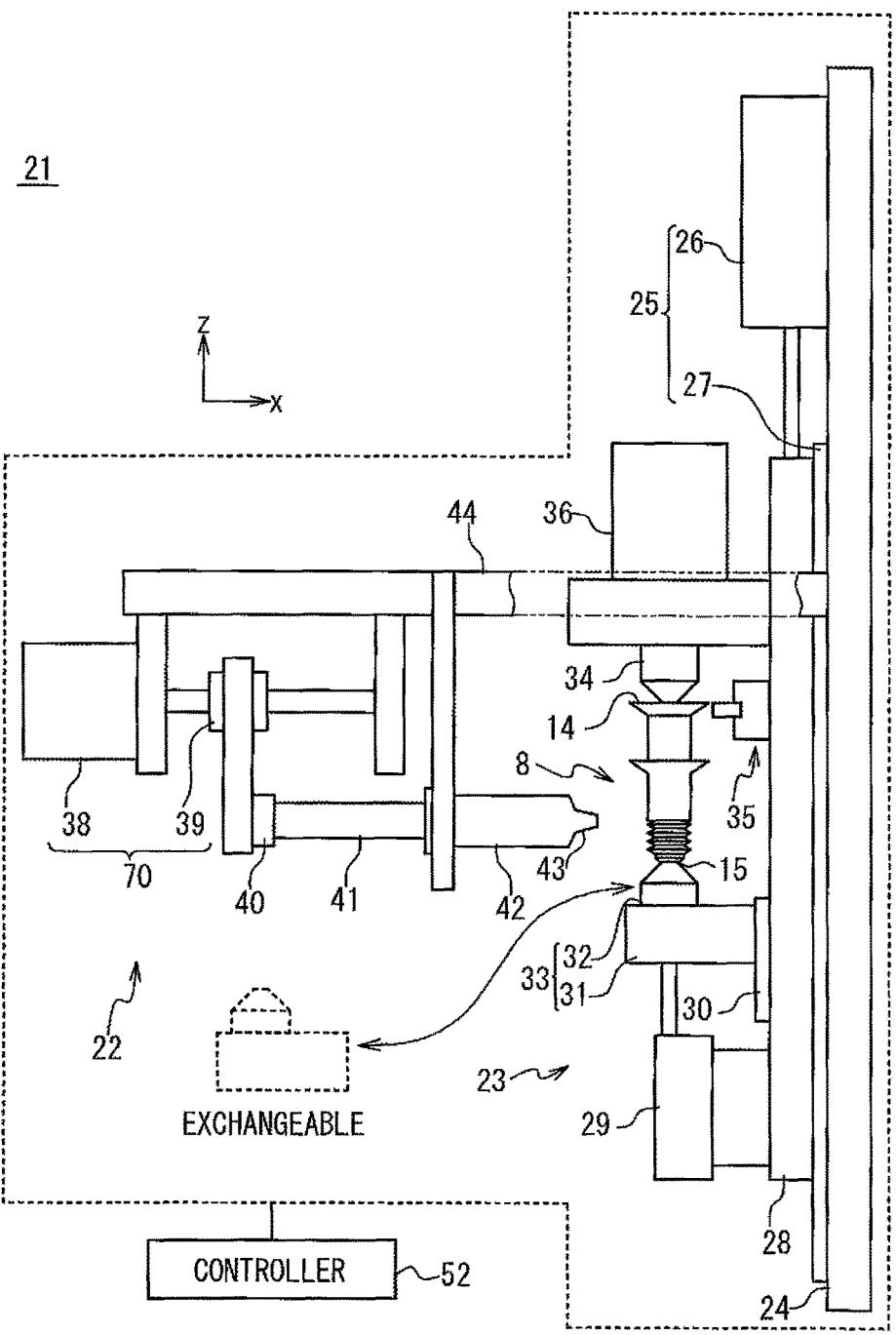
FIG. 8 is a configuration diagram showing a sealant applying apparatus according to a first embodiment.

FIG. 8 is a diagram showing a configuration of a sealant applying apparatus 21 according to a first embodiment. The sealant applying apparatus 21 according to the present embodiment is used to apply a sealant to the axis section of the fastener 8. In the present embodiment, a hack tight fastener is used as the fastener 8. However, as the fastener 8, fasters except for the hack tight fastener may be used, and for example, a rivet, a bolt and so on can be used.

The Z axial direction and the X axial direction are defined in FIG. 8. The Z axial direction is orthogonal to the X axial direction.

The sealant applying apparatus 21 includes a controller 52, a sealant discharging unit 22 and a fastener rotating unit 23.

The fastener rotating unit 23 is configured to support the fastener 8 to be rotatable. The fastener 8 is supported so that the central axis of the fastener 8 is along the Z axial direction. The fastener 8 rotates around the central axis of the fastener 8.

The sealant discharging unit 22 is configured to discharge the sealant and to apply the sealant onto the fastener 8.

The controller 52 is realized by a computer and so on, to have a function of controlling the operations of the fastener rotating unit 23 and the sealant discharging unit 22.

Hereinafter, each unit will be described.

First, the fastener rotating unit 23 will be described. The fastener rotating unit 23 includes a first base 24, a second base 28, a fastener axial feeder 25, a first holding member 33, a second holding member 34, a motor 36 (a driving mechanism), a biasing section 29, a linear motion guide 30 and a centering mechanism 35.

The first base 24 supports the first holding member 33, the second holding member 34, the motor 36 (the driving mechanism), the biasing section 29, the linear motion guide 30 and the centering mechanism 35.

The fastener axial feeder 25 has a function of moving the fastener 8 along the Z axial direction. The fastener axial feeder 25 has a linear motion guide 27 and a cylinder 26. The cylinder 26 is connected to the second base 28 and supports the second base 28 to be movable along the Z axial direction. The linear motion guide 27 has a function of guiding the second base 28 so as to move along the Z axial direction.

The first holding member 33 and the second holding member 34 are members which hold the fastener 8. The first holding member 33 and the second holding member 34 are arranged on a same straight line parallel to the Z axial direction to face each other.

The first holding member 33 is supported by the biasing section 29 and is guided by the linear motion guide 30. The first holding member 33 is movable along the Z axial direction by the linear motion guide 30. Specifically, the first holding member 33 has a tailstock table 31 and a first holding section 32. The tailstock table 31 is supported by the biasing section 29 and is guided by the linear motion guide 30. The first holding section 32 is a contacting section with a tip portion (end surface 15) of the fastener 8 and is supported by the talistock table 31. The first holding section 32 is supported to be rotatable around a rotation axis parallel to the Z axial direction. The first holding section 32 has a taper shape. That is, the first holding section 32 has a shape in which a portion nearer the tip is thinner. Also, the tip portion of the first holding section 32 has been moderately chamfered to prevent the occurrence of a scratch of the fastener 8 and the delamination of the surface treating of the fastener 8.

Here, the first holding member 33 is installed to be exchangeable. That is, the first holding member 33 can be detached or removed from the linear motion guide 30 and the biasing section 29. Thus, the first holding member 33 can be detached or removed from the first base 24 and the second base 28.

The second holding member 34 is a contact section with the proximal end (head upper surface 14) of the fastener 8 and is supported by the second base 28. The second holding member 34 has a tapered shape like the first holding section 32 and has the shape in which a portion nearer the tip is thinner. Also, like the first holding section 32, the tip portion of the second holding member 34 has been moderately chamfered.

The fastener 8 is supported by the first holding member 33 and the second holding member 34 so that the central axis is along the Z axial direction.

The motor 36 (driving mechanism) has a function of rotating the fastener 8. The motor 36 is fixed to the second base 28. The shaft of the motor 36 is parallel to the Z axial direction. The shaft of the motor 36 is connected with the second holding member 34. The motor 36 rotates the second holding member 34 such that the fastener 8 is rotated around the central axis.

The biasing section 29 includes an actuator, a spring or the like and has a function of biasing the tailstock table 31 (the first holding member 33) toward the second holding member 34. The biasing section 29 is fixed on the second base 28. By disposing the biasing section 29, the first holding member 33 and the second holding member 34 hold the fastener 8 in a direction of the axial of the fastener 8.

The centering mechanism 35 has a function of adjusting the position of the fastener 8 so that the central axis of the fastener 8 coincides with the rotation axis of the first holding member 33 and the second holding member 34.

Next, the sealant discharging unit 22 will be described. As shown in FIG. 8, the sealant discharging unit 22 includes a sealant cartridge 42, a discharge punch 41, a discharge punch feeder 70, a reaction sensor 40 and a support structure 44.

The support structure 44 supports the sealant cartridge 42 and the discharge punch feeder 70. The support structure 44 is supported by the first base 24.

The sealant cartridge 42 is a container holding the sealant. The sealant cartridge 42 includes a nozzle 43. The axial direction of the nozzle 43 is parallel to the X axial direction. The sealant is discharged for the fastener 8 through the nozzle 43 from the sealant cartridge 42.

The discharge punch feeder 70 has a function of pushing the discharge punch 41 into the sealant cartridge 42. The discharge punch feeder 70 includes a servo motor 38 and a ball screw 39. The discharge punch feeder 70 moves the discharge punch 41 in parallel to the X axial direction to push it into the sealant cartridge 42. By pushing the discharge punch 41 into the sealant cartridge 42, the sealant is discharged from the nozzle 43. By performing a feedback control so that the rotation frequency of the servo motor 38 is constant, the discharge punch feeder 70 pushes the discharge punch 41 into the sealant cartridge 42 at a constant velocity.

The reaction sensor 40 has a function of detecting a pushing reaction which acts on the discharge punch 41, and is realized by a load cell, a piezo-electric device and so on. The reaction sensor 40 may be configured to detect the pushing reaction based on a motor current value of the servo motor 38.

Next, the outline of an operation method of the sealant applying apparatus 21 will be described.

First, the fastener 8 as an application object is held by the first holding member 33 and the second holding member 34.

Next, the motor 36 is driven by the controller 52 to rotate the fastener 8.

Next, the sealant is discharged from the sealant discharging unit 22 by the controller 52. Thus, the sealant is discharged for the axial portion of the fastener 8. Also, at the same time, the fastener 8 is moved along the Z axial direction by the fastener axial feeder 25. Thus, the sealant is applied to the whole axial portion of the fastener 8.

After the application, a next fastener 8 is exchanged the fastener 8 for and the application of the sealant is repeated.

Here, in the application of the sealant, the sealant sometimes adheres to the first holding member 33. If the sealant adheres to the first holding member 33, the sealant has been sometimes applied to an unnecessary part of the next fastener 8 when the next fastener 8 is held. Also, when the sealant cartridge 42 becomes empty, the exchange of the sealant cartridge 42 is performed. Or, a new sealant is filled into the sealant cartridge 42. When the sealant is exchanged or is filled into the sealant cartridge, there is a case that the quality and kind of the sealant are different between the previous sealant and the new sealant. In such a case, if the previous sealant adheres to the first holding member 33, it is not desirable in that the previous sealant different from the new sealant in the the quality and kind is adhered to the fastener 8.

On the other hand, in the present embodiment, the first holding member 33 is exchangeable. Therefore, according to need, the first holding member 33 is detached or removed from the second base 28 and is exchanged for a new first holding member 33. Thus, it is prevented that the sealant which has adhered to the first holding member 33 adheres to the next fastener 8. Note that it is desirable that the first holding member 33 is exchanged in the exchange of the sealant (at the time of filling of the sealant or exchange of the sealant cartridge 42). By exchanging the first holding member 33 in the exchange of the sealant, it can be prevented that the sealant of a different quality (or kind) is mixed in case of applying the sealant to the next fastener 8.

Next, details of each section of sealant applying apparatus 21 will be described.

Figure 9:
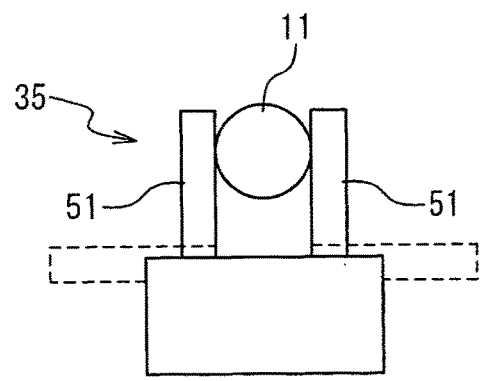
FIG. 9 is a diagram schematically showing a centering mechanism.

First, the centering mechanism 35 will be described. FIG. 9 is a diagram schematically showing the centering mechanism 35. The centering mechanism 35 includes a plurality of contact sections 51. The contact section 51 is called a centering finger. The plurality of contact sections 51 are movable in a plane orthogonal to the Z axial direction. The plurality of contact sections 51 contact the countersink head 11 of the fastener 8 and the position of the fastener 8 is adjusted so that the central axis of the fastener 8 coincides with the rotation axis of the fastener rotating unit (thus, the centering is performed).

Figure 10:
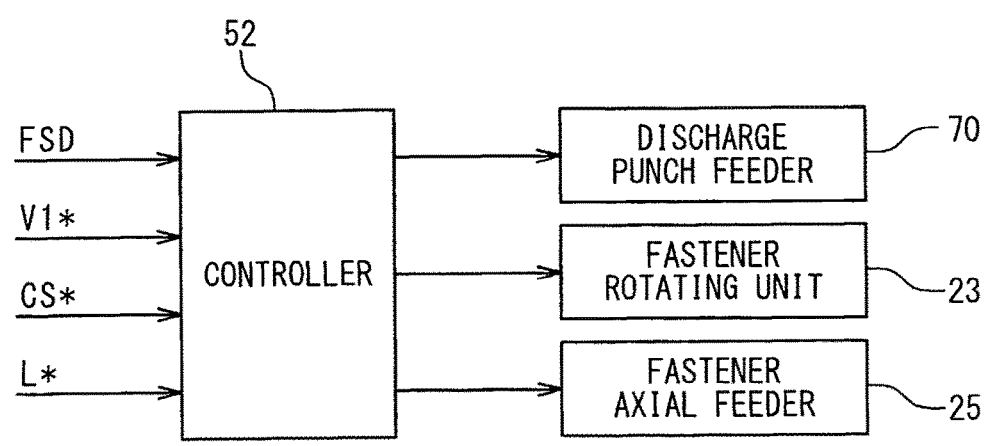
FIG. 10 is a diagram schematically showing a controller.

Next, the controller 52 will be described. As shown in FIG. 10, the controller 52 inputs fastener shape data FSD, a discharge punch feed velocity set value V1*, a fastener circumferential velocity set value CS* and a lead set value L*, and controls the discharge punch feeder 70, the fastener rotating unit 23 and the fastener axial feeder 25. The fastener shape data FSD indicates a relation between a position of the fastener 8 in an axis direction for the sealant to be applied (sleeve 10 and head side surface 18) and the outer diameter of the fastener 8 at the position. The discharge punch feed velocity set value V1* is a predetermined constant value set for the feed velocity of the discharge punch 41. The fastener circumferential velocity set value CS* is a predetermined constant value set for the circumferential velocity at the position of the fastener 8 so that the position of the fastener 8 in the axial direction coincides with the nozzle 43. The lead set value L* is a predetermined constant value set for a relative movement distance of the fastener 8 and the sealant discharging unit 22 in the Z axial direction while the fastener 8 is rotated one revolution.

Next, the sealant applying method using the sealant applying apparatus 21 will be described in detail. First, the fastener 8 is set in the fastener rotating unit 23.

Figure 11:
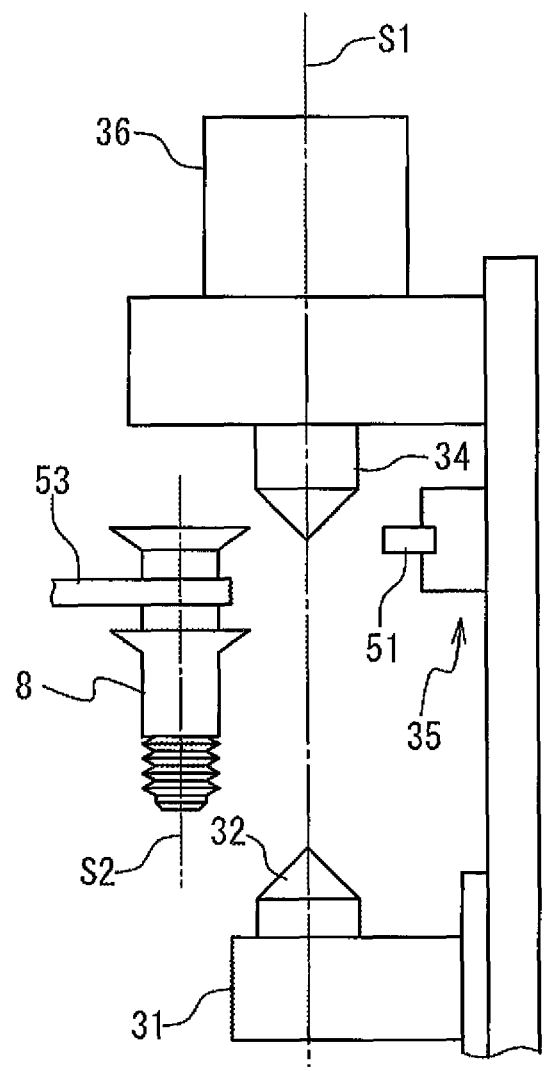
FIG. 11 is a diagram showing a method of holding a fastener.

As shown in FIG. 11, the distance between the first holding section 32 and the second holding member 34 is made longer than the axial length of the fastener 8. In the centering mechanism 35, the plurality of contact sections 51 are opened. The rotation axis S1 of the fastener rotating unit 23 and the central axis S2 of the fastener 8 are shown in FIG. 11. A conveying unit 53 conveys the fastener 8 between the first holding section 32 and the second holding member 34 so that the fastener 8 is transferred to the fastener rotating unit 23 from the conveying apparatus 53.

Figure 12:
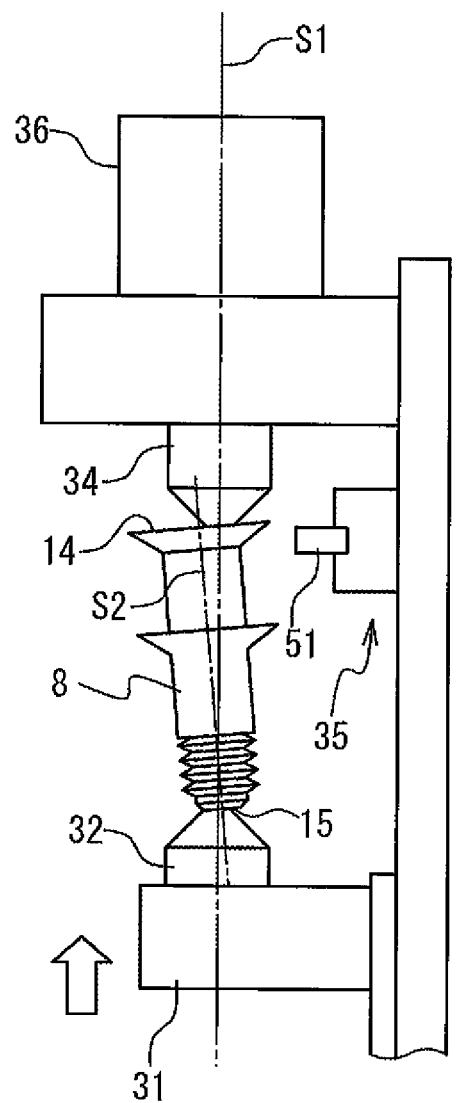
FIG. 12 is a diagram showing the method of holding the fastener.

As shown in FIG. 12, the biasing section 29 biases the first holding section 32 through the tailstock table 31, so that the fastener 8 is held axially by the first holding section 32 and the second holding member 34. Here, the tip portion of the second holding member 34 contacts the head surface 14 of the fastener 8 and the tip portion of the first holding section 32 contacts the end surface 15 of the fastener 8. The fastener center axis S2 does not coincide with the rotation axis S1 at this step.

Figure 13:
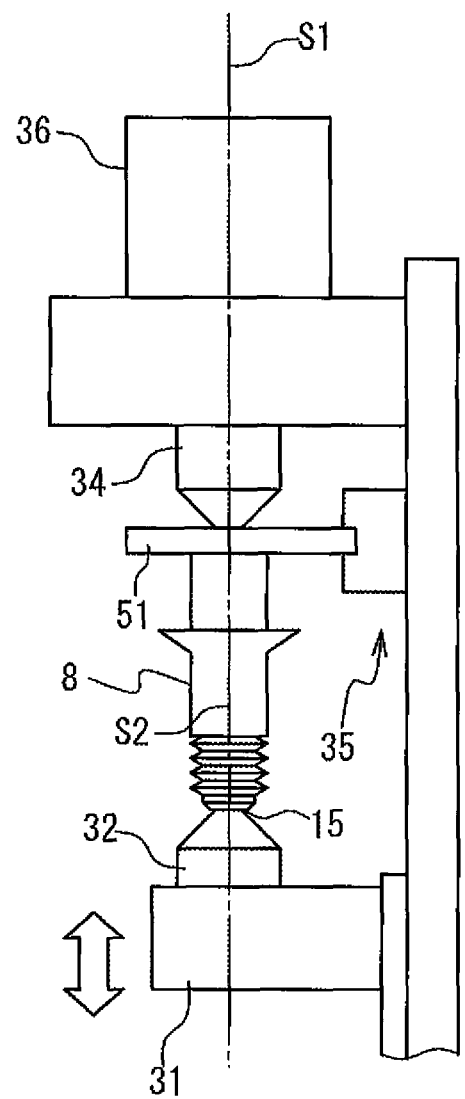
FIG. 13 is a diagram showing the method of holding the fastener.

As shown in FIG. 13, the position of the fastener 8 is adjusted such that the plurality of contact sections 51 of the centering mechanism 35 are closed to contact the countersink head 11 of the fastener 8 and the fastener center axis S2 coincides with the rotation axis S1. At this time, the tailstock table 31 and the first holding section 32 are biased toward the second holding member 34. However, the positions of the tailstock table 31 and the first holding section 32 are controlled to appropriate positions, because the tailstock table 31 and the first holding section 32 move in parallel to the Z axial direction.

Figure 14:
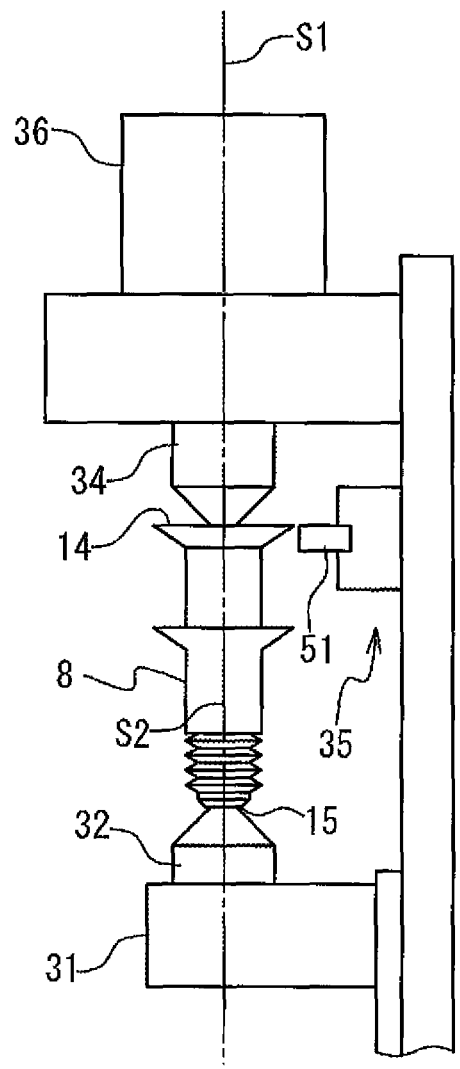
FIG. 14 is a diagram showing the method of holding the fastener.

As shown in FIG. 14, the plurality of contact sections 51 of the centering mechanism 35 are opened to leave the fastener 8. When the fastener 8 is rotated, the plurality of contact sections 51 are in a condition apart from the fastener 8.

Figure 15:
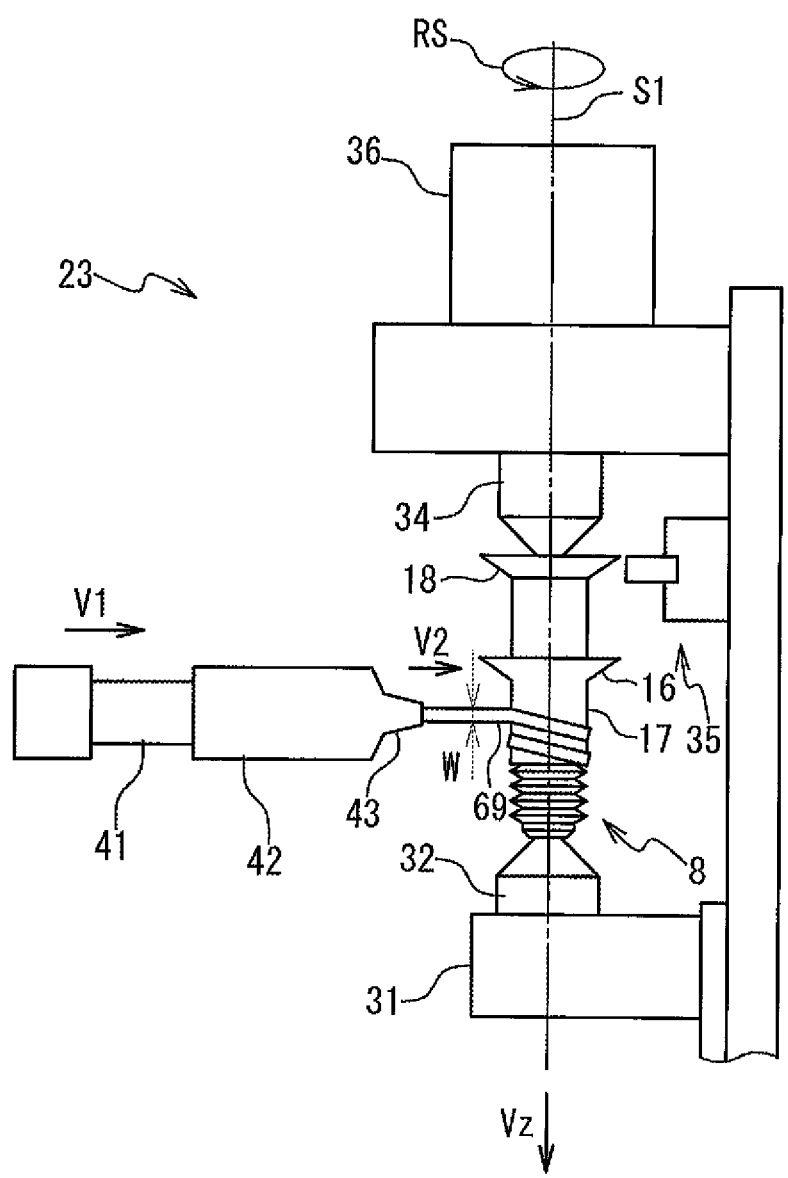
FIG. 15 is a diagram showing the method of holding the fastener.

As shown in FIG. 15, when the fastener 8 is rotated, the sealant 69 is discharged from the nozzle 43 at a constant discharge quantity while moving the fastener 8 in the Z axial direction. Thus, the sealant 69 is applied to the fastener 8.

More specifically, the controller 52 controls the discharge punch feeder 70 such that the discharge punch 41 is pushed into the sealant cartridge 42 at a constant discharge punch feed velocity V1 which is coincident with the discharge punch feed velocity set value V1*. As a result, the sealant is discharged from the nozzle 43 at the constant discharge quantity. At this time, the sealant 69 is discharged in a constant thickness (or width) W and a constant discharge velocity V2. The above-mentioned fastener circumferential velocity set value CS* is previously determined to correspond to the sealant discharge velocity V2. The above-mentioned lead set value L* is previously determined to correspond to the sealant thickness W. The controller 52 controls the fastener rotating unit 23 based on the fastener shape data FSD such that the circumferential velocity at a position of the fastener 8 which coincides with the position of the nozzle 43 becomes a constant fastener circumferential velocity set value CS*. Also, the controller 52 controls the fastener axial feeder 25 such that a distance by which the fastener rotating unit 23 and the sealant discharging unit 22 relatively move in the axial direction of the fastener 8 while the fastener 8 rotated one revolution, is a constant lead set value L*. Therefore, when the sealant is applied on the cylinder section 17 having a constant outer diameter in the axial direction of the fastener 8, the fastener rotating unit 23 keeps the rotation frequency RS of the fastener 8 constant, and the fastener axial feeder 25 keeps the axial feed velocity Vz of of the fastener rotating unit 23 for the fastener 8 constant. When the sealant is applied on the countersink section 16 and the head side surface 18 of the fastener 8 in which the outer diameter changes along the axial direction of the fastener 8, the controller 52 changes the fastener rotation frequency RS and the fastener axial feeder 25 changes the fastener axial feed velocity Vz.

Figure 16:
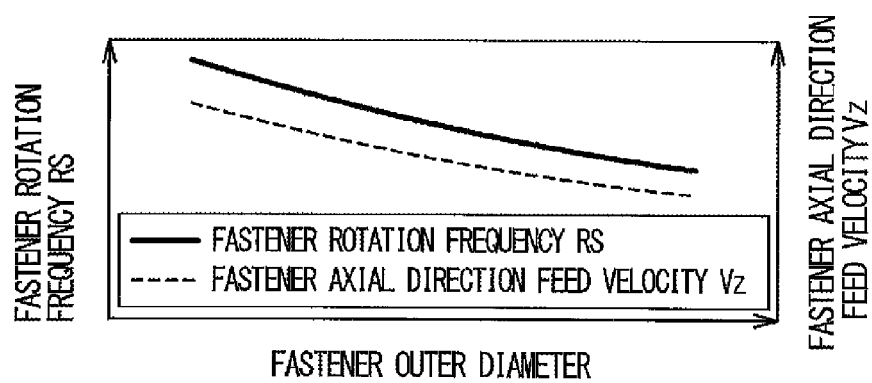
FIG. 16 is a graph showing a relation between an outer diameter and a fastener rotation frequency RS of the fastener and a relation between the outer diameter of the fastener and a fastener axial feed velocity Vz.

FIG. 16 shows a relation between the rotation frequency RS of the fastener 8 and the outer diameter at a portion of the fastener 8 which coincides with the position of the nozzle 43, and a relation between the fastener axial feed velocity Vz and and the outer diameter at the axial position of the fastener 8 which coincides with the position of the nozzle 43. That is, when the outer diameter at the axial position of the fastener 8 which coincides with the position of the nozzle 43 increases along the axial direction, the fastener rotation frequency RS and the fastener axial feed velocity Vz decrease. When the outer diameter at the axial position of the fastener 8 which coincides with the position of the nozzle 43 decreases along the axial direction, the fastener rotation frequency RS and the fastener axial feed velocity Vz increase. The control of decreasing the fastener rotation frequency RS and the fastener axial feed velocity Vz at the same time and the control of increasing the fastener rotation frequency RS and the fastener axial feed velocity Vz at the same time are suitable to uniformly apply the sealant on a cone-shaped surface like the countersink section 16 and the head side surface 18.

Figure 17:
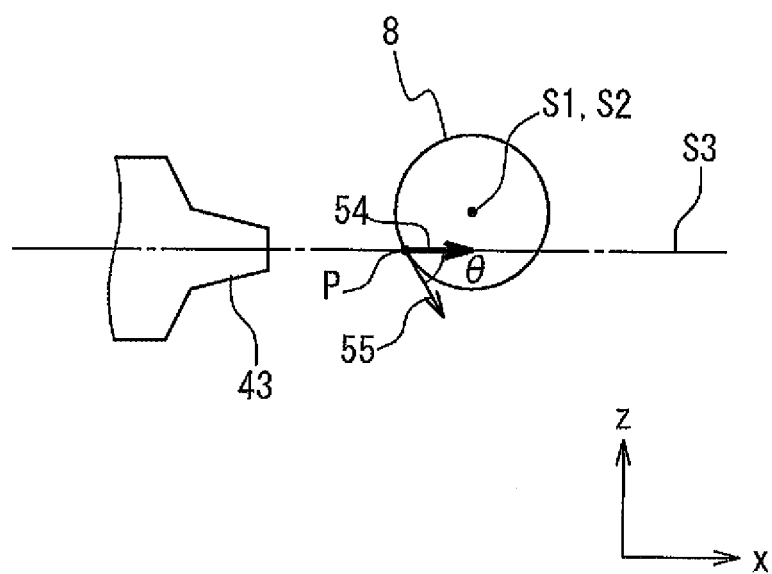
FIG. 17 is a diagram showing a fastener section.

FIG. 17 shows a sectional view of the fastener 8 which is orthogonal to the rotation axis S1 (the fastener center axis S2) in the position of the nozzle 43. In this case, an angle θ is an angle between a discharge direction vector 54 showing the discharge direction of the sealant from the nozzle 43 and a circumferential velocity vector 55 showing a circumferential velocity of the fastener 8 at a point P, which is the nearest to the nozzle 43, of intersection points of the central axis S3 of the nozzle 43 and the outer surface of the fastener 8. When the nozzle center axis S3 is deviated from the rotation axis S1 (the fastener center axis S2) so that the angle θ becomes acute, the application quality of the sealant becomes good, because the sealant is not disordered when the sealant bumps against the fastener 8. Note that the nozzle center axis S3 may be parallel to the X axial direction, or may be declined from the X axial direction, in the plane which is orthogonal to the rotation axis S1 (the fastener center axis S2). Note that the application quality of the sealant becomes relatively bad but the nozzle center axis S3 may pass through the rotation axis S1 (the fastener center axis S2).

As described above, according to the present embodiment, because the first holding member 33 is exchangeable, it can be prevented that the sealant of a different quality (or different kind) is mixed, when the sealant is applied to the fastener 8.

Also, according to the present embodiment, the first holding member 33 and the second holding member 34 hold the fastener 8 in the axial direction. More specifically, the first holding member 33 and the second holding member 34 hold the fastener 8 so that the tip portion of the second holding member 34 contacts the head surface 14 and the tip portion of the first holding section 32 contacts the end surface 15. Therefore, it is theoretically possible to apply the sealant to the circumference of the axis section of the fastener 8 without leaving a non-applied area. Therefore, the sealant applying apparatus 21 according to the present embodiment is suitable to apply the sealant to the axis section of the fastener 8.

Moreover, according to the present embodiment, it is possible to make the fastener center axis S2 surely coincide with the rotation axis S1 by the centering mechanism 35. Also, the contact sections 51 are in a condition part from the fastener 8 when the sealant is applied to the fastener 8. Therefore, there is no case that the contact sections 51 hinder the sealant application. Moreover, because the first holding section 32 and the second holding member 34 have tapered shapes, it is possible to make the sealant difficult to adhere to the first holding section 32 and the second holding member 34, even if the sealant is applied to the end (e.g. the head side surface 18) of the fastener 8.

Also, the sealant is, generally, high-viscosity fluid, and becomes hard as the time elapse (viscosity increases). When such a sealant is used, it is not possible to attain a constant discharge quantity of the sealant, if the control of making a pushing force of the discharge punch 41 constant is carried out. Therefore, in such a case, it is difficult to uniformly apply the sealant to the fastener 8. However, according to the present embodiment, the discharge quantity of the sealant is controlled to be constant, because the discharge punch feeder 70 changes or controls the pushing force of the discharge punch 41 so that the pushing velocity of the discharge punch 41 becomes constant. Therefore, it is easy to uniformly apply the sealant to the fastener 8.

Also, the quality of the sealant applied to the fastener 8 can be controlled, by detecting by the reaction sensor 40, a push reaction which acts on the discharge punch 41 when discharging the sealant.

Note that in the above description, the first holding member 33 is movable along the Z axial direction to the second base 28. The motor 36 and the second holding member 34 are immovable in the Z axial direction to the second base 28, and the biasing section 29 biases the first holding member 33 so that the first holding member 33 and the second holding member 34 approach each other. Note that the first holding member 33 may be immovable in parallel to a Y axial direction to the second base 28, the motor 36 and the second holding member 34 are made movable in the Z axial direction to the second base 28, and the biasing section 29 may bias the motor 36 and the second holding member 34 so that the first holding member 33 and the second holding member 34 approach each other.

Also, in the above description, the second base 28 is movable in the parallel to the Z axial direction to the first base 24, the sealant discharging unit 22 is immovable in parallel to the Z axial direction to the first base 24, and the cylinder 26 moves the second base in parallel to the Z axial direction. Note that the second base 28 is made immovable in parallel to the Z axial direction to the first base 24, the sealant discharging unit 22 is made movable in parallel to the Z axial direction to the first base 24, and the cylinder 26 may move the sealant discharging unit 22 in parallel to the Z axial direction.

Second Embodiment

Next, a second embodiment will be described. An exchanging mechanism 45 and a stocker 46 are added to the sealant applying apparatus 21 according to the present embodiment. Because the configuration like the first embodiment can be adopted regarding the other components, the detailed description is omitted.

Figure 18:
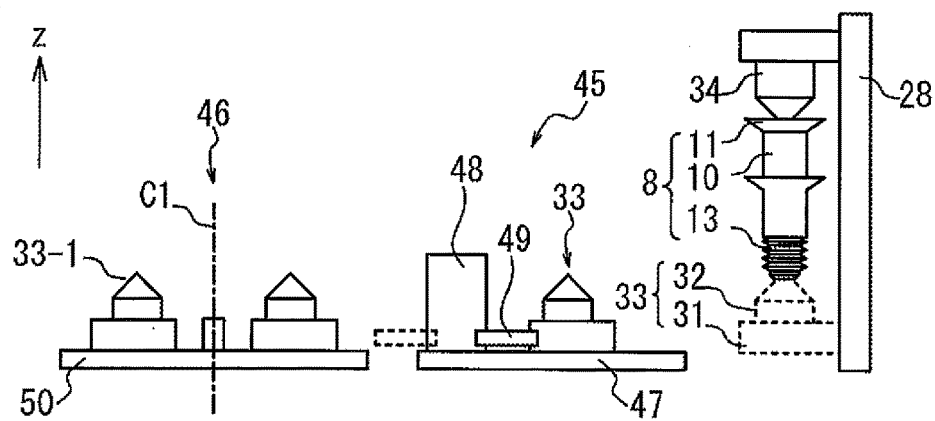
FIG. 18 is a side view showing an exchanging mechanism and a stocker.
Figure 19:
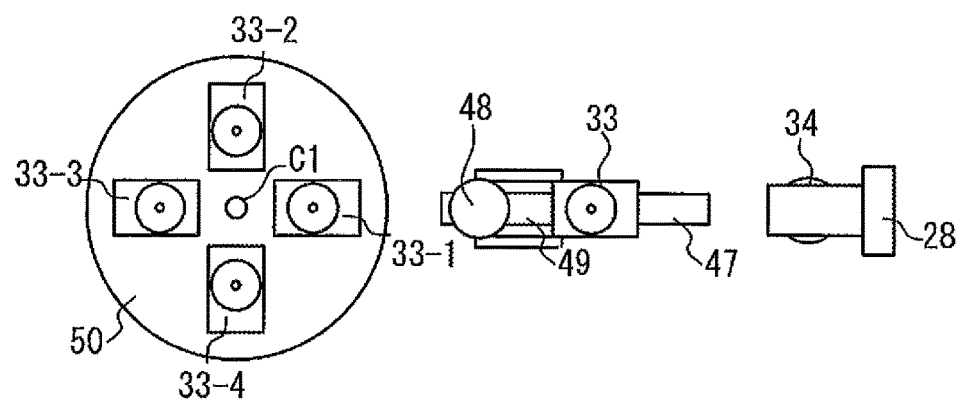
FIG. 19 is a plan view showing the exchanging mechanism and the stocker.

FIG. 18 is a side view showing the exchanging mechanism 45 and the stocker 46. Also, FIG. 19 is a plan view showing the exchanging mechanism 45 and the stocker 46.

The stocker 46 includes a locating member 50. The locating member 50 is rotatable around the rotation axis C1 parallel to the Z axial direction. A plurality of spare first holding members (33-1 to 33-4) are put on the stocker 46.

The exchanging mechanism 45 to exchange the first holding member 33 for either of plurality of spare first holding members (33-1-33-4). The exchanging mechanism 45 includes an exchanging mechanism base 47, an axis member 48 and a holding member 49.

The axis member 48 is disposed on the exchanging mechanism base 47 to be along a direction parallel to the Z axial direction. The axis member 48 is rotatable around the axis. The exchanging mechanism base 47 is movable in the direction parallel to the Z axial direction.

The holding member 49 is connected to the axis member 48. The holding member 49 is configured to support the first holding member 33.

In the sealant applying apparatus 21 according to the present embodiment, the first holding member 33 attached to the second base 28 is supported by the holding member 49 in the exchange and is removed. The exchanging mechanism 45 locates the removed first holding member 33 on the stocker 46. After that, the stocker 46 is rotated and the exchanging mechanism 45 holds either of the plurality of spare first holding members (33-1 to 33-4) by the holding member 49. The exchanging mechanism 45 attaches the spare first holding member to the second base 28. Thus, the first holding member 33 is exchanged with either of plurality of spare first holding members (33-1 to 33-4).

According to the present embodiment, the first holding member 33 can automatically be exchanged.

In addition, because the stocker 46 is disposed, it is possible to prepare the spare first holding member 33 previously. After the first holding member 33 is removed, the spare first holding member can be immediately attached so that the work time can be reduced. Also, simultaneously with application of the sealant, another work (for example, cleaning of removed first holding member 33) can be carried out and the work time can be more reduced.

Third Embodiment

Next, a third embodiment will be described. The present embodiment is the same as the previously mentioned embodiments except for the following description.

Figure 20:
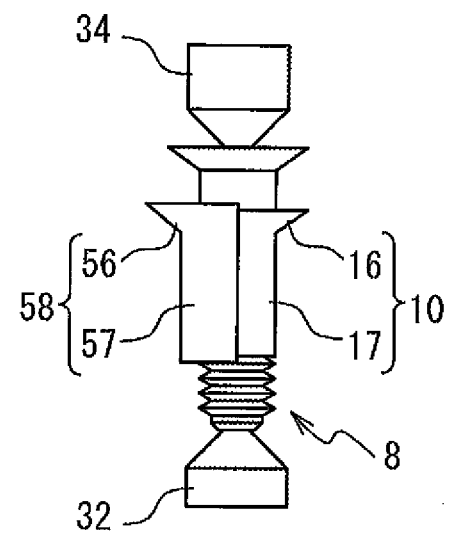
FIG. 20 is a diagram showing a film thickness adjusting member.

As shown in FIG. 20, the sealant applying apparatus 21 includes a film thickness adjusting member 58. The film thickness adjusting member 58 has a shape corresponding to the shape of a part of the fastener 8 for the sealant to be applied. For example, the film thickness adjusting member 58 has the shape obtained by dividing a circular cylinder body with a cone portion into two along the shape of the sleeve 10 in a longitudinal direction. The film thickness adjusting member 58 includes a partial cone section 56 corresponding to a countersink section 16 and a partial circular cylinder section 57 corresponding to the circular cylinder section 17.

Figure 21:
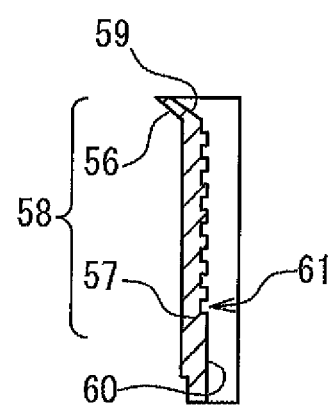
FIG. 21 is a section showing the film thickness adjusting member.

As shown in FIG. 21, the inner surface 59 of partial cone section 56 is formed to be along the shape of the countersink section 16. The inner surface 60 of the partial circular cylinder section 57 is formed to be along the shape of the circular cylinder section 17. Also, it is desirable that a plurality of ditches 61 are formed in the inner surface 60 to be parallel to each other. For example, the plurality of ditches 61 are formed as a spiral ditch in the inner surface 60 of the partial circular cylinder section of the circular cylinder body with the above cone section. The film thickness adjusting member 58 is installed on the second base 28 so that a gap is formed between the inner surface 59 and the countersink section 16 and between the inner surface 60 and the circular cylinder section 17 in a condition that the inner surface 59 faces countersink section 16 and the inner surface 60 faces the circular cylinder part 17.

According to the present embodiment, the sealant on the sleeve 10 is extended by the film thickness adjusting member 58. Therefore, the sealant application film can be made thin. Also, even if air is mixed into the sealant cartridge 42, it can be prevented that a part (non-coating part) where the sealant is not applied to the surface of the sleeve 10 is generated. Moreover, the plurality of ditches 61 on the inner surface 60 attain the following effects. That is, the sealant spread out of the film thickness adjusting member 58 if the plurality of ditches 61 are not disposed, fills the plurality of ditches 61 and is applied to the fastener 8. Therefore, many fasteners 8 can be applied with a little amount of the sealant. Note that a ditch may be formed in the inner surface 59.

Moreover, if the film thickness adjusting member 58 is formed of flexible material such as rubber, a space between the film thickness adjusting member 58 and the fastener 8 is made small so that the sealant application film can be made further thinner. Or, instead of the film thickness adjusting member 58, a waveform film thickness adjusting member, a whisk, a spatula or the like may be used.

Fourth Embodiment

Next, a fourth embodiment will be described. The present embodiment is the same as the previously mentioned embodiments except for the following descriptions.

Figure 22:
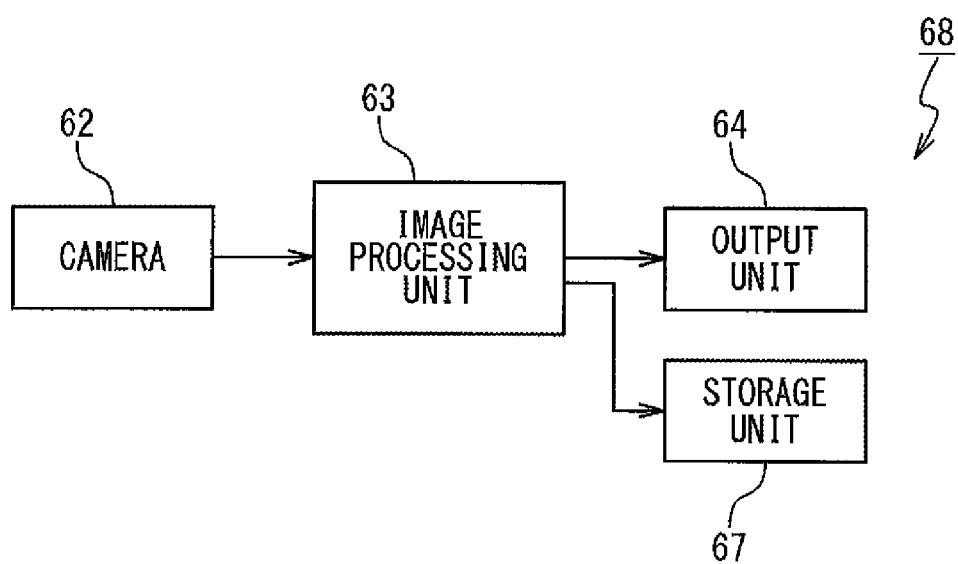
FIG. 22 is a diagram showing a seal application state confirming unit.

As shown in FIG. 22, the sealant applying apparatus 21 according to the present embodiment includes a seal application state confirming unit 68. The seal application state confirming unit 68 includes a camera 62, an image processing unit 63, an output unit 64 and a storage unit 67.

Figure 23:
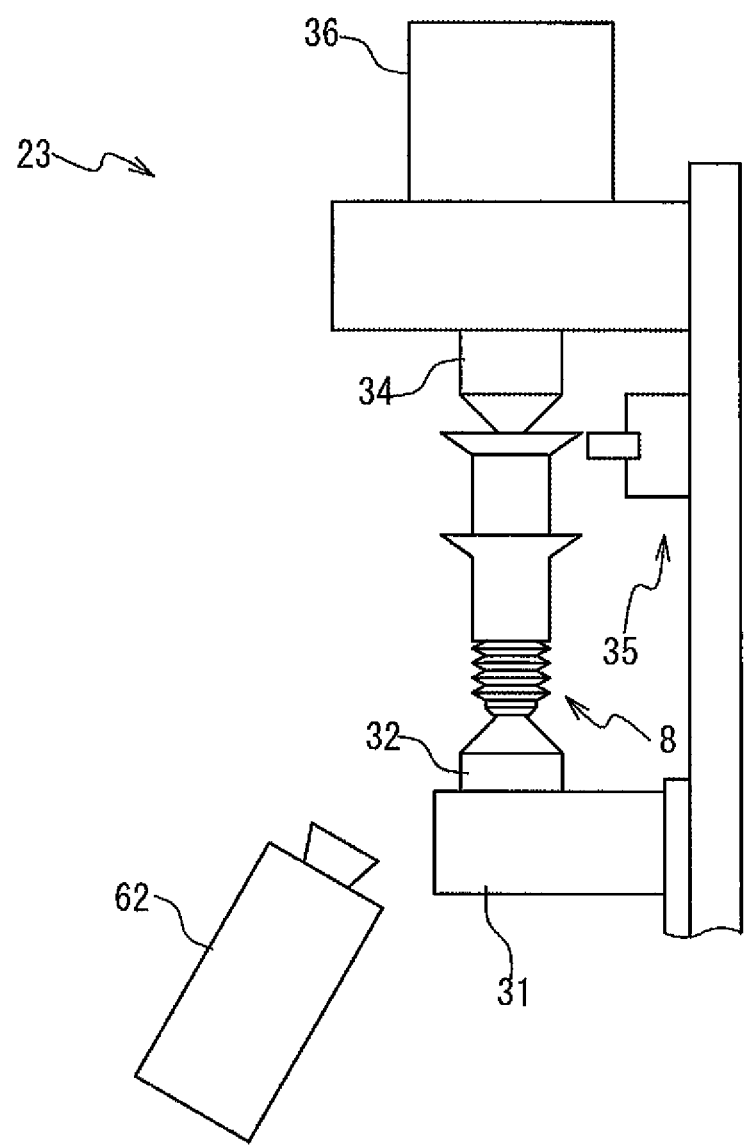
FIG. 23 is a diagram schematically showing a camera.

As shown in FIG. 23, the camera 62 takes an image of the fastener 8 in a condition set in the fastener rotating unit 23 (a condition held by the first holding section 32 and the second holding member 34) to generate image data. Because the fastener rotating unit 23 rotates the fastener 8, the image of the fastener 8 can be taken in a plurality of rotation positions. Therefore, the application state of the sealant in the whole circumference of the fastener 8 can be confirmed.

The image processing unit 63 executes image processing of the image data taken by the camera 62 to detect a part of the fastener (application part) where the sealant 8 has been applied and a part of the fastener 8 (non-coating part) where no sealant is applied. In this case, when the countersunk bolt 9 and sleeve 10 of the fastener 8 are made of metal and the sealant is black, the detection of the application part (a black part) and the non-coating part (a metal color part) is easy.

The output unit 64 outputs an error when the non-coating part is detected. In this case, the sealant is applied to the non-coating part in handwork. The output unit 64 may output the image of the fastener 8 before the image processing and the image of the fastener 8 after the image processing.

The storage unit 67 relates the image data before the image processing, the image data after the image processing and the detection result of the application part and the non-coating part to an identifier of the fastener 8 to store them. These data are used for a quality control and so on.

As above, the sealant applying apparatus and the sealant applying method according to the present invention have been described with reference to the embodiments. However, the present invention is not limited to the above embodiments, and various changes and modifications may be carried out to the above embodiments, and these changes and modification are contained in the present invention.

For example, another centering mechanism 35 may be added to center the fastener 8 so that the fastener center axis S2 coincides with the rotation axis S1 of the fastener rotating unit 23 by contacting the screw section 13 and the circular cylinder section 17 of the fastener 8.

Note that this patent application is based on and claims the priority of Japanese patent application No. JP 2012-239154. The disclosure thereof is incorporated herein by reference.

The invention claimed is:

1. A sealant applying apparatus comprising:
   a fastener rotating unit to support a fastener to be rotatable around a central axis of the fastener; and
   a sealant discharging unit to discharge a sealant to apply the sealant to the fastener,
   wherein the fastener rotating unit comprises:
   a first base configured to support a second base, a fastener axial feeder and the sealant discharging unit;
   the second base configured to support a first holding member and a second holding member;
   the fastener axial feeder disposed on the first base to move the second base in a direction parallel to the central axis of the fastener; and
   the first holding member and the second holding member configured to hold the fastener to be rotatable and arranged on a same straight line parallel to a Z-axis so as to face each other, the first holding member being arranged under the second holding member, and
   the first holding member is installed to the second base to be exchangeable,
   wherein the sealant discharging unit comprises:
   a sealant cartridge configured to hold and discharge the sealant; and
   a discharge punch configured to be pushed into the sealant cartridge, and wherein the fastener axial feeder comprises:
   a linear motion guide for guiding the second base; and
   a cylinder for moving the second base along the linear motion guide.

2. The sealant applying apparatus according to claim 1, wherein the fastener comprises a pipe-shaped sleeve, and a countersunk bolt inserted in the sleeve,
   wherein the countersunk bolt comprises a screw section disposed at one end, and a countersunk head section disposed at the other end, and
   wherein the first holding member is arranged to be brought into contact with the one end of the countersunk bolt, and the second holding member is arranged to be brought into contact with the other end of the countersunk bolt.

3. The sealant applying apparatus according to claim 1, further comprising:
   a stocker configured to store a plurality of spare first holding members; and
   an exchanging mechanism configured to exchange the first holding member for either of the plurality of spare first holding members.

4. The sealant applying apparatus according to claim 3, wherein the stocker has a locating member that rotates around a stocker center axis, and
wherein the plurality of spare first holding members is put on the locating member.

5. The sealant applying apparatus according to claim 1, wherein at least one of the first holding member and the second holding member has a holding section that becomes thinner toward a tip thereof.

6. The sealant applying apparatus according to claim 1, wherein the fastener rotating unit further comprises a driving mechanism configured to rotate the first holding member or the second holding member, and the driving mechanism comprises a motor.

7. The sealant applying apparatus according to claim 1, wherein the fastener rotating unit further comprises a biasing mechanism configured to bias one of the first holding member and the second holding member to approach the other of the first holding member and the second holding member.

8. The sealant applying apparatus according to claim 1, wherein the sealant discharging unit further comprises a discharge punch feeder configured to push the discharge punch into the sealant cartridge in a constant velocity such that the sealant is discharged.

* * * * *